(12) United States Patent
Newton et al.

(10) Patent No.: US 10,696,531 B2
(45) Date of Patent: Jun. 30, 2020

(54) HIGH RATIO FLUID CONTROL

(71) Applicants: John Newton, Vero Beach, FL (US); Peter Brooke, Micco, FL (US); Dustin Hartsfield, Sebastian, FL (US); Michael Cheney, Vero Beach, FL (US); Gillian Callaghan, Vero Beach, FL (US)

(72) Inventors: John Newton, Vero Beach, FL (US); Peter Brooke, Micco, FL (US); Dustin Hartsfield, Sebastian, FL (US); Michael Cheney, Vero Beach, FL (US); Gillian Callaghan, Vero Beach, FL (US)

(73) Assignee: GATE CFV SOLUTIONS, INC., Sebastian, FL (US)

( * ) Notice: Subject to any disclaimer, the term of this patent is extended or adjusted under 35 U.S.C. 154(b) by 0 days.

(21) Appl. No.: 16/437,610

(22) Filed: Jun. 11, 2019

(65) Prior Publication Data
US 2019/0292038 A1 Sep. 26, 2019

Related U.S. Application Data

(63) Continuation of application No. 15/978,957, filed on May 14, 2018.

(60) Provisional application No. 62/506,083, filed on May 15, 2017.

(51) Int. Cl.
*B67D 1/12* (2006.01)
*G05D 11/03* (2006.01)
*B67D 1/00* (2006.01)
*B01F 3/08* (2006.01)
*B67D 1/14* (2006.01)

(52) U.S. Cl.
CPC .......... *B67D 1/1204* (2013.01); *B01F 3/0861* (2013.01); *B67D 1/0016* (2013.01); *B67D 1/1286* (2013.01); *G05D 11/03* (2013.01); *B01F 2215/0022* (2013.01); *B67D 2001/1483* (2013.01)

(58) Field of Classification Search
CPC .. B67D 1/1204; B67D 1/0016; B67D 1/1286; B67D 2001/1483; B01F 3/0861; B01F 2215/0022; G05D 11/00
USPC ...................................................... 222/129.3
See application file for complete search history.

(56) References Cited

U.S. PATENT DOCUMENTS

| | | | | | |
|---|---|---|---|---|---|
| 2,984,261 | A | * | 5/1961 | Kates | G05D 7/0133 138/46 |
| 3,394,847 | A | * | 7/1968 | Garrard | B01F 13/1013 222/56 |
| 3,460,713 | A | * | 8/1969 | Cornelius | B67D 1/0016 222/1 |

(Continued)

*Primary Examiner* — Patrick M. Buechner
*Assistant Examiner* — Michael J. Melaragno
(74) *Attorney, Agent, or Firm* — CF3; Stephen Eisenmann

(57) ABSTRACT

Examples disclosed herein relate to a dispensing device including a syrup unit which transmits via one or more orifices one or more syrups and water to a dispensing block, a syrup source coupled to the syrup unit which provides the one or more syrups to the syrup unit, a water source which provides water to the syrup unit, and a cf valve coupled to a first orifice upstream of a solenoid valve where the cf valve provides a first range of pressures to the solenoid valve and where the first orifice is coupled to the dispensing block.

6 Claims, 11 Drawing Sheets

(56) References Cited

U.S. PATENT DOCUMENTS

| | | | | |
|---|---|---|---|---|
| 3,591,051 A * | 7/1971 | Mitchell | B67D 1/0016 | 222/56 |
| 3,813,010 A * | 5/1974 | Hassell | B01F 3/04815 | 222/129.1 |
| 3,995,770 A * | 12/1976 | Schwitters | B67D 1/0016 | 222/56 |
| 4,044,792 A * | 8/1977 | Kjaergaard | G05D 16/0655 | 137/505.22 |
| 4,250,919 A * | 2/1981 | Booth | B67D 1/1466 | 137/329.1 |
| 4,266,726 A * | 5/1981 | Brown | B67D 1/0085 | 222/129.1 |
| 4,363,424 A * | 12/1982 | Holben | B67D 1/008 | 222/4 |
| 4,741,355 A * | 5/1988 | Credle, Jr. | B67D 1/0044 | 137/269 |
| 4,859,376 A * | 8/1989 | Hancock | B01F 3/04241 | 261/35 |
| 4,957,220 A * | 9/1990 | Du | B67D 1/1247 | 222/129.1 |
| 4,966,306 A * | 10/1990 | Credle, Jr. | B67D 1/0048 | 141/362 |
| 5,000,219 A * | 3/1991 | Taube, Sr. | G05D 7/0126 | 137/501 |
| 5,042,697 A * | 8/1991 | Warren | B65D 83/44 | 222/402.1 |
| 5,121,855 A * | 6/1992 | Credle, Jr. | B67D 1/0044 | 137/99 |
| 5,145,092 A * | 9/1992 | Shannon | B67D 1/04 | 222/136 |
| 5,226,450 A * | 7/1993 | Lambourn | B01F 5/0077 | 137/607 |
| 5,314,091 A * | 5/1994 | Credle, Jr. | B67D 1/0021 | 222/129.1 |
| 5,381,926 A * | 1/1995 | Credle, Jr. | B67D 1/0032 | 222/1 |
| 5,411,179 A * | 5/1995 | Oyler | B67D 1/00 | 222/129.1 |
| 5,553,749 A * | 9/1996 | Oyler | B67D 1/00 | 222/129.1 |
| 5,565,149 A * | 10/1996 | Page | B01D 19/0031 | 210/321.8 |
| 5,842,600 A * | 12/1998 | Singleterry | A23L 2/54 | 222/1 |
| 5,957,119 A * | 9/1999 | Perry | F41B 11/724 | 124/73 |
| 6,394,312 B1 * | 5/2002 | Endou | B67D 1/0032 | 222/129.1 |
| 6,536,224 B2 * | 3/2003 | Frank | A23G 9/045 | 251/253 |
| 6,625,993 B2 * | 9/2003 | Frank | A23G 9/045 | 62/303 |
| 6,685,054 B2 * | 2/2004 | Kameyama | B67D 1/0037 | 222/129.3 |
| 6,827,100 B1 * | 12/2004 | Carlson | G05D 7/0106 | 137/454.6 |
| 8,091,582 B2 * | 1/2012 | Folk | F16K 31/365 | 137/489 |
| 8,550,101 B2 * | 10/2013 | Folk | F16K 31/365 | 137/14 |
| 8,695,630 B2 * | 4/2014 | Folk | F16K 31/365 | 137/505.14 |
| 9,249,896 B2 * | 2/2016 | Folk | F16K 31/365 | |
| 9,867,493 B2 * | 1/2018 | Novak | B65D 85/73 | |
| 2002/0043071 A1 * | 4/2002 | Frank | A23G 9/045 | 62/135 |
| 2002/0060226 A1 * | 5/2002 | Kameyama | B67D 1/0037 | 222/1 |
| 2003/0126871 A1 * | 7/2003 | Frank | A23G 9/045 | 62/135 |
| 2006/0219739 A1 * | 10/2006 | Crisp, III | B67D 1/0021 | 222/399 |
| 2008/0041876 A1 * | 2/2008 | Frank | A23G 9/045 | 222/1 |
| 2010/0127015 A1 * | 5/2010 | Boyer | B67D 1/0036 | 222/1 |
| 2011/0226354 A1 * | 9/2011 | Thordarson | G05D 16/0672 | 137/487 |
| 2012/0012199 A1 * | 1/2012 | Folk | F16K 31/365 | 137/485 |
| 2012/0035761 A1 * | 2/2012 | Tilton | G07F 13/065 | 700/233 |
| 2013/0231774 A1 * | 9/2013 | Tilton | G07F 13/065 | 700/233 |
| 2013/0292407 A1 * | 11/2013 | Beavis | B67D 7/221 | 222/1 |
| 2014/0174562 A1 * | 6/2014 | Folk | F16K 31/365 | 137/488 |
| 2015/0225224 A1 * | 8/2015 | Tilton | G07F 13/065 | 705/26.7 |
| 2016/0106136 A1 * | 4/2016 | Gordon | A47J 31/407 | 426/477 |
| 2016/0130127 A1 * | 5/2016 | Copenhaver | B67D 1/0037 | 222/129.3 |
| 2016/0368753 A1 * | 12/2016 | Bethuy | B67D 1/0025 | |
| 2017/0050834 A1 * | 2/2017 | Beavis | B67D 1/0036 | |
| 2018/0354772 A1 * | 12/2018 | Cheney | B67D 7/0255 | |

\* cited by examiner

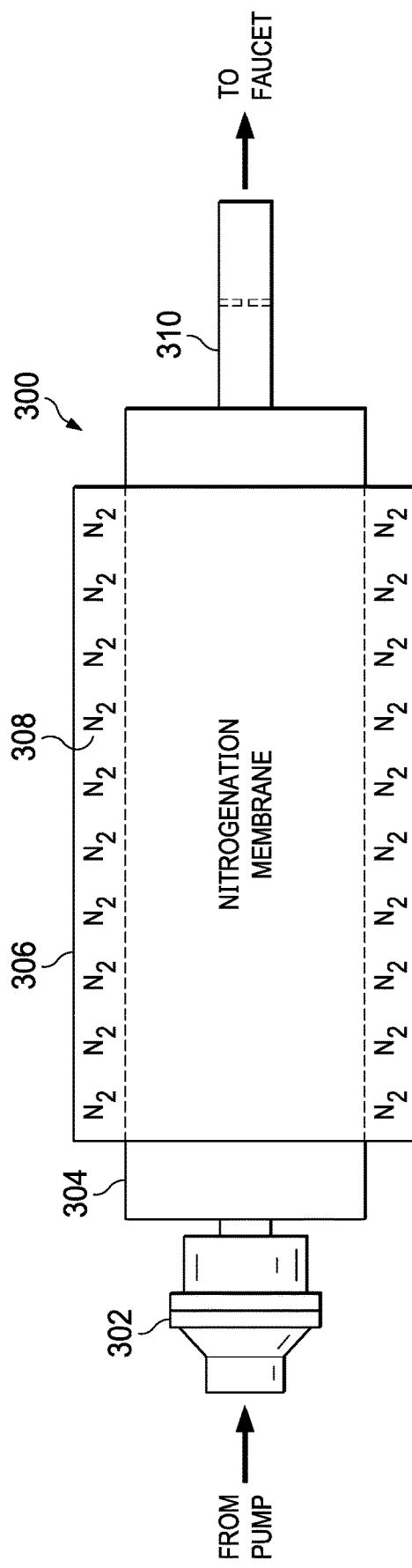
FIG. 3
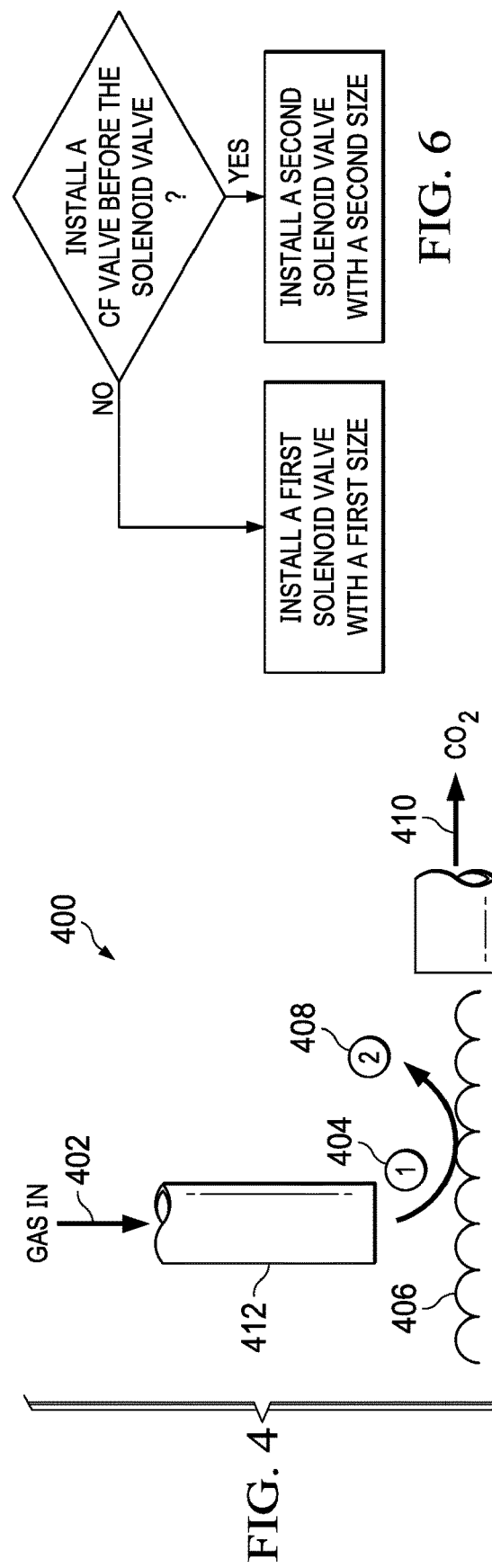
FIG. 6
FIG. 4

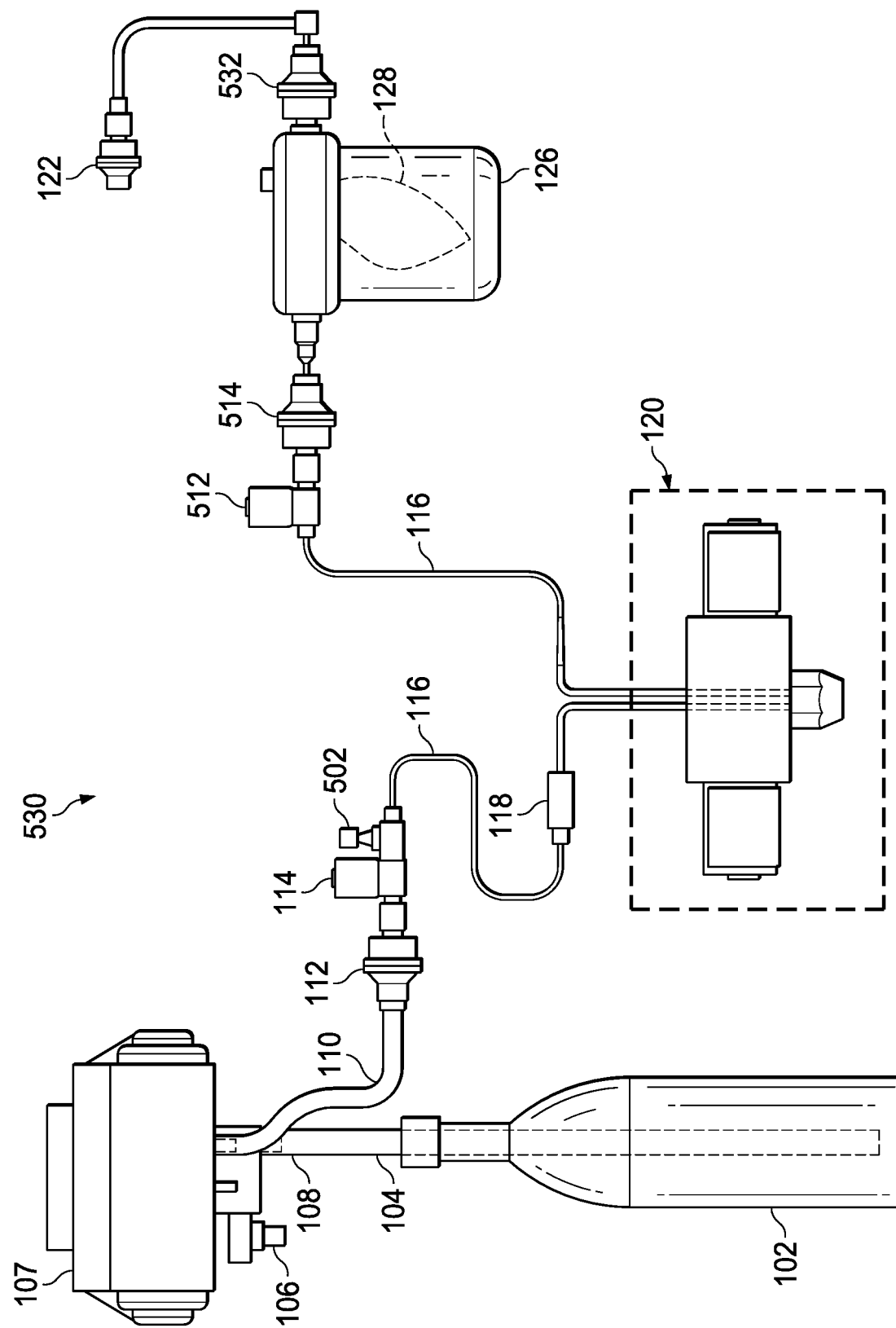

HIGH RATIO FLUID CONTROL

REFERENCE

The present application is a continuation application of U.S. patent application Ser. No. 15/978,957, entitled "High Ratio Fluid Control", filed on May 14, 2018, which claims priority to U.S. provisional patent application Ser. No. 62/506,083, entitled "High Ratio Fluid Control", filed on May 15, 2017, which are incorporated in their entirety herein by reference.

FIELD

The subject matter disclosed herein relates to a dispensing unit. More specifically, to a cf valve functionality that allows for enhanced fluid control.

INFORMATION

The dispensing industry has numerous ways to dispense one or more fluids and/or gases. This disclosure highlights enhanced devices, methods, and systems for dispensing these one or more fluids and/or gases.

BRIEF DESCRIPTION OF THE FIGURES

Non-limiting and non-exhaustive examples will be described with reference to the following figures, wherein like reference numerals refer to like parts throughout the various figures.

FIG. 3 is an illustration of a membrane device, according to one embodiment.

FIG. 4 is an illustration of a CO2 generating device, according to one embodiment.

FIG. 5C is another illustration of a dispensing system, according to one embodiment.

FIG. 6 is a flow chart, according to one embodiment.

DETAILED DESCRIPTION

Figure 1:
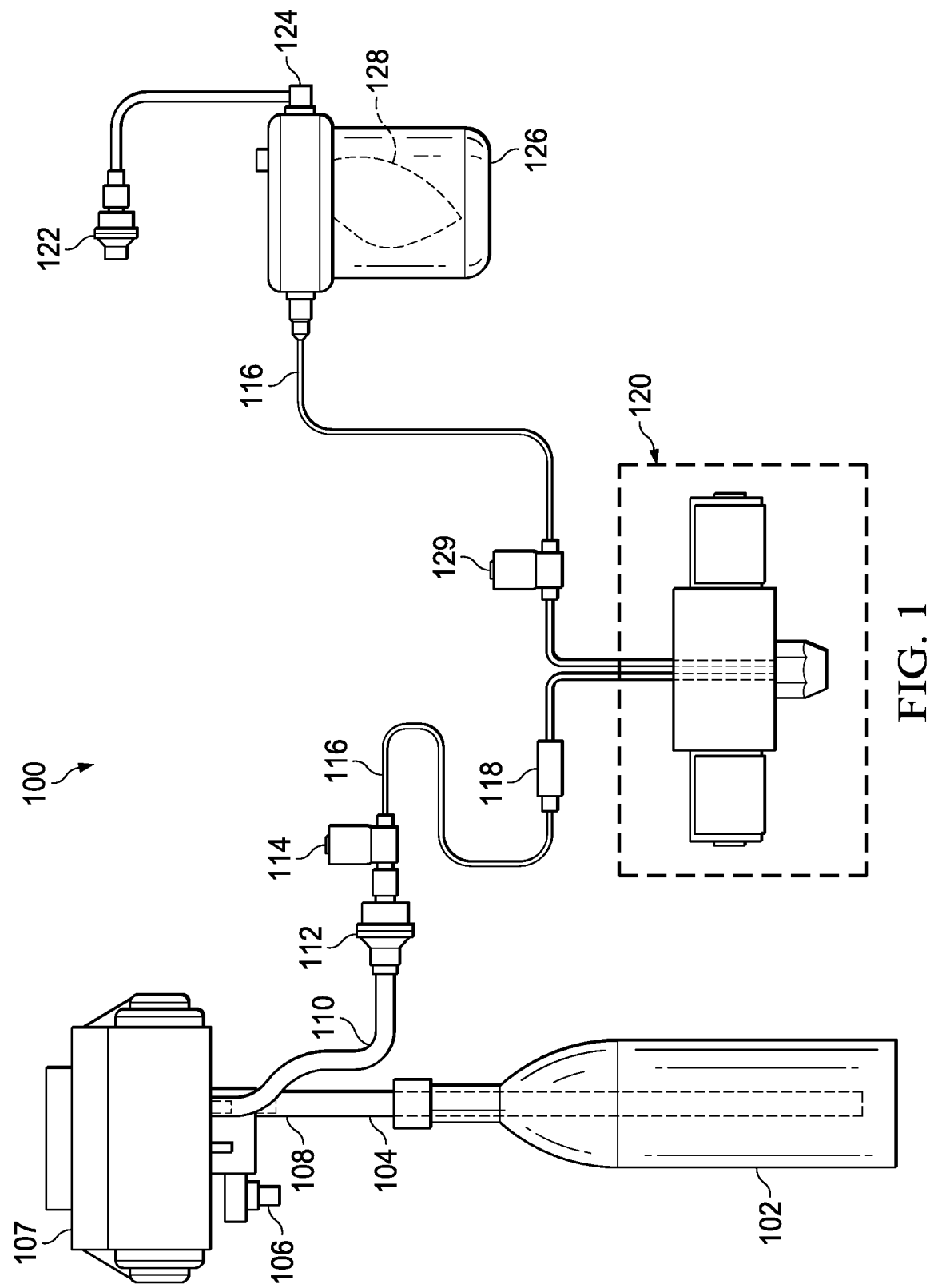
FIG. 1 is an illustration of a dispensing system, according to one embodiment.

In FIG. 1, a first dispensing system 100 is shown. The first dispensing system 100 includes a syrup source 102, a syrup input line 104, a syrup input area 108, a first CO2 input area 106, a second CO2 input area 122, a syrup out line 110, a CF Valve 112, a solenoid valve 114, a tube orifice 116, a check valve/adaptor 118, and a dispensing unit 120. Further, the first dispensing system 100 includes the second CO2 input area 122, a purge valve 124, a pressurized vessel 126 with a concentrate bag 128, another tube orifice 116, and a second solenoid value 129 (which feeds into the dispensing unit 120). In this example, solenoid valve 114 may be reduced in size and cost because the CF Valve 112 maintains a relatively constant pressure and/or flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 20 PSI) to a second pressure (e.g., 60 PSI) has a first cost. Whereas, a second solenoid that has to be able to handle varying pressures from a third pressure (e.g., 13.8 PSI) to a fourth pressure (e.g., 14.2 PSI) has a second cost (see FIGS. 2A and 2B). In this example, the first cost is higher than the second cost because the pressure range is larger for the first solenoid versus the second solenoid. The syrup dispensing unit 107 (top left side of FIG. 1) which has the syrup input area 108, the first CO2 input area 106, and the syrup out line 110 coupled to the dispensing unit. The dispensing unit 107 may be electrical, mechanical, pneumatical operated and/or any combination thereof.

Figure 2A:
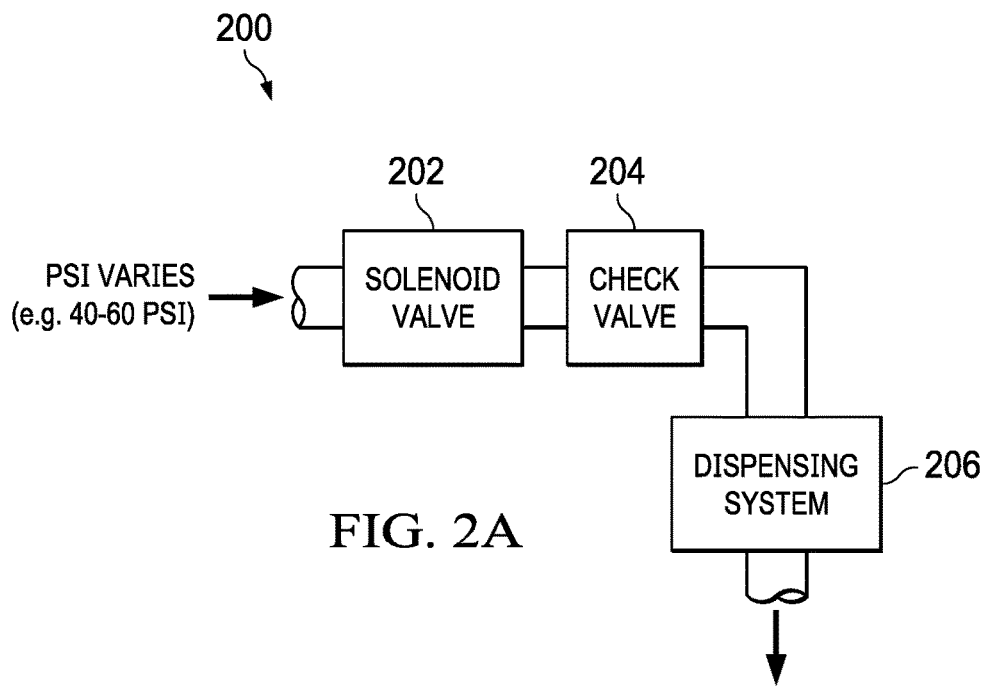
FIG. 2A is an illustration of a pressure device.
Figure 2B:
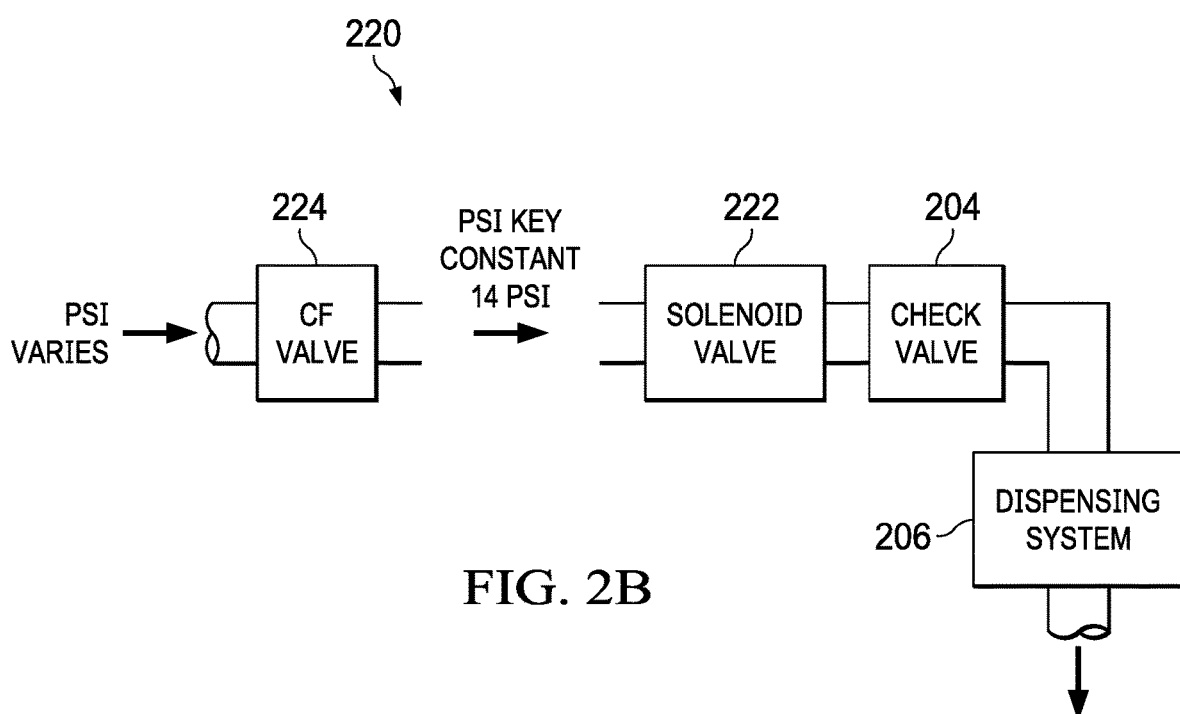
FIG. 2B is another illustration of a pressure device, according to one embodiment.

In the first example shown in FIG. 2A, a conventional system 200 is shown. A first solenoid valve 202 has an input source with varying pressures (e.g., PSI varies from 40 to 60 PSI) and the first solenoid has a first size and a first cost. The output from the first solenoid 202 goes through a tube orifice to a check valve 204 and then to a dispensing system 206. In the second example shown in FIG. 2B, a CF Valve system 220 includes a CF Valve 224 which has an input source with varying pressures and an output area with has a constant pressure and flow rate (e.g., 14 PSI) which enters a second solenoid valve 222 where the second solenoid valve 222 has a second size and a second cost. The output from the second solenoid 222 goes through a tube orifice to a check valve 204 and then to a dispensing system 206. In these examples, the second size and the second cost of the second solenoid valve 222 are far less than the first size and first cost of the first solenoid valve 202.

In FIG. 3, a membrane system 300 is shown. In one example, an input from a pump enters a CF Valve 302 which then exits the CF Valve 302 at a constant pressure and/or flow rate while entering a tube 304. The tube orifice 304 is surrounded by a membrane 306 which has one or more elements 308 (which in this example is N2). In this example, the N2 enters the fluid passing by the membrane 306 and exits the tube 304 at the exit area 310 towards the faucet.

In FIG. 4, a CO2 generator 400 is shown. In this example, a gas 402 is delivered via a tube 412 towards a generator 406. When the gas 402 goes from point one 404 and hits the generator 406 and moves to point two 408 a mixture 410 is created.

Figure 5A:
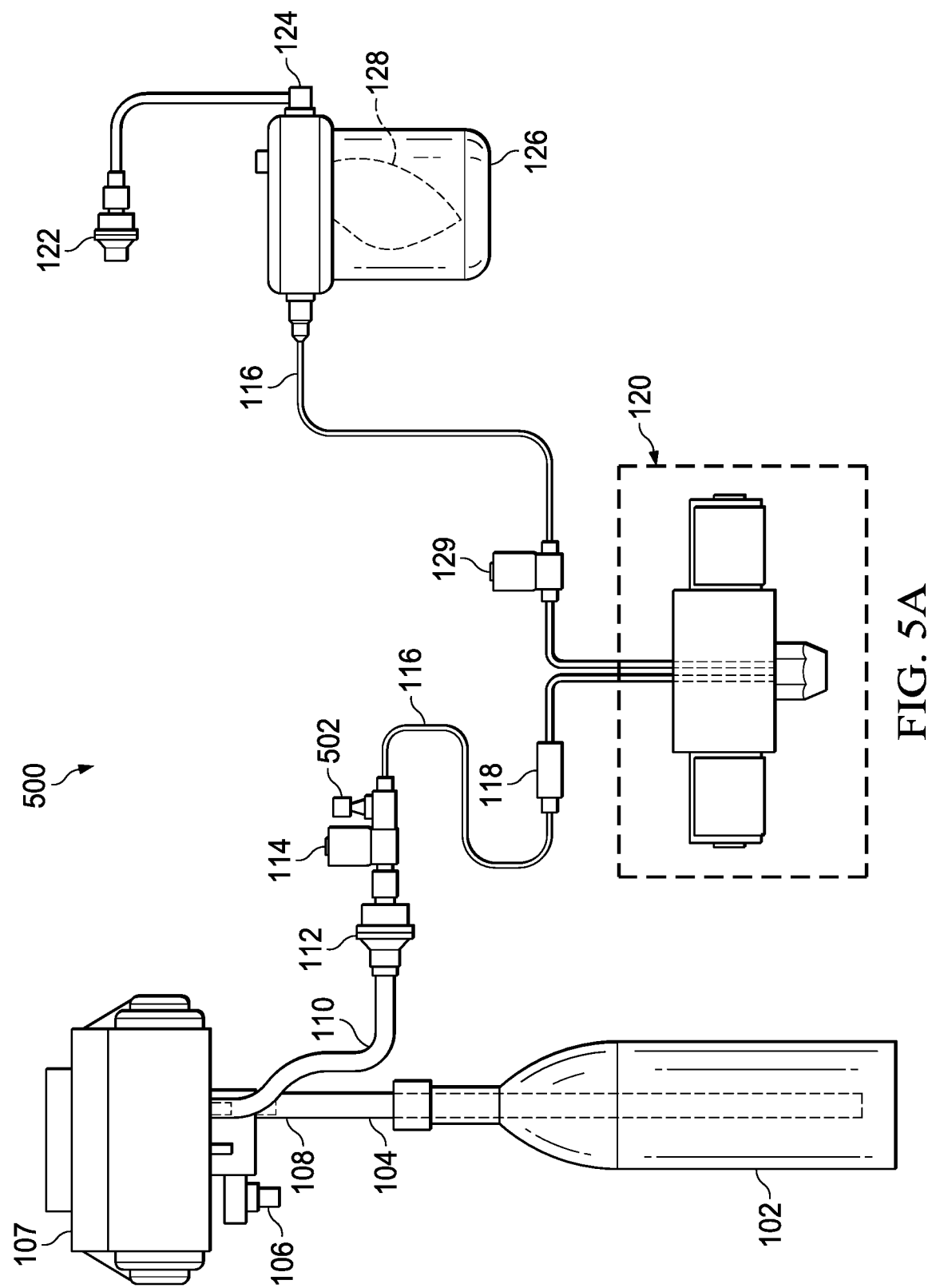
FIG. 5A is another illustration of a dispensing system, according to one embodiment.

In FIG. 5A, a second dispensing system 500 is shown. The second dispensing system 500 includes the syrup source 102, the syrup input line 104, the syrup input area 108, the first CO2 input area 106, the second CO2 input area 122, the syrup out line 110, the CF Valve 112, the solenoid valve 114, a needle valve 502, the tube orifice 116, the check valve/adaptor 118, and the dispensing unit 120. Further, the second dispensing system 500 includes the second CO2 input area 122, the purge valve 124, the pressurized vessel 126 with the concentrate bag 128, another tube orifice 116, and the second solenoid value 129 (which feeds into the dispensing unit 120). In this example, the solenoid valve 114 may be reduced in size and cost because the CF Valve 112 maintains a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 10 PSI) to a second pressure (e.g., 70 PSI) has a first cost. Whereas, a second solenoid that has to be able to handle varying pressures from a third pressure (e.g., 13.9 PSI) to a fourth pressure (e.g., 14.1 PSI) has a second cost (see FIGS. 2A and 2B). In this example, the first cost is higher than the second cost because the pressure range is larger for the first solenoid versus the second solenoid.

Figure 5B:
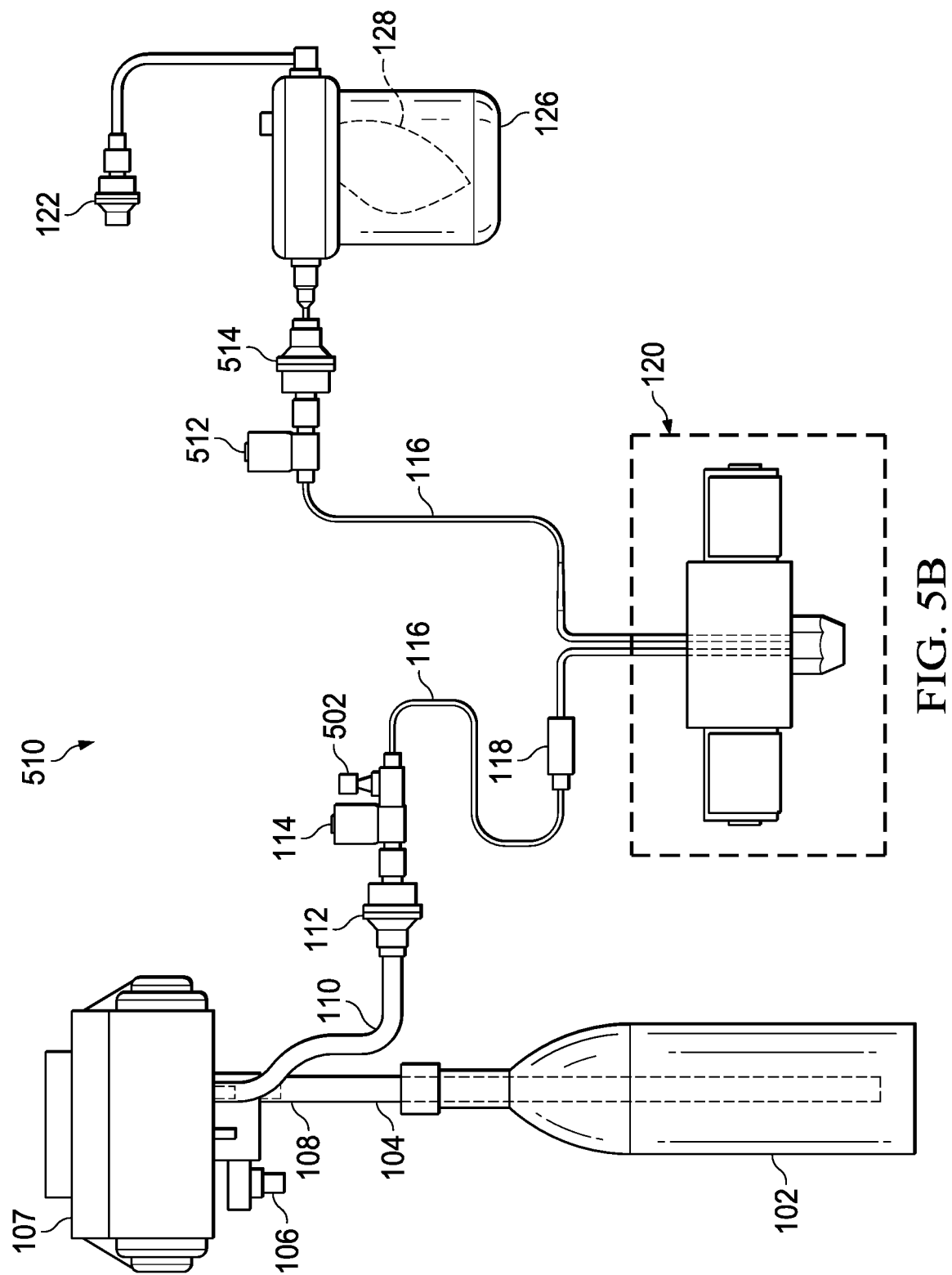
FIG. 5B is another illustration of a dispensing system, according to one embodiment.

In FIG. 5B, a third dispensing system 510 is shown. The third dispensing system 510 includes the syrup source 102, the syrup input line 104, the syrup input area 108, the first CO2 input area 106, the second CO2 input area 122, the syrup out line 110, the CF Valve 112, the solenoid valve 114, the needle valve 502, the tube orifice 116, the check valve/adaptor 118, and the dispensing unit 120. Further, the third dispensing system 510 includes the second CO2 input area 122, the pressurized vessel 126 with the concentrate bag 128, a second CF Valve 514, a second solenoid valve 512, another tube orifice 116 which feeds into the dispensing unit 120). In this example, solenoid valve 114 and/or second solenoid valve 512 may be reduced in size and cost because the CF Valve 112 and/or the second CF Valve maintain a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 25 PSI) to a second pressure (e.g., 50 PSI) has a first cost. Whereas, a second solenoid that has to be able to handle varying pressures from a third pressure (e.g., 13.7 PSI) to a fourth pressure (e.g., 14.3 PSI) has a second cost (see FIGS. 2A and 2B). In this example, the first cost is higher than the second cost because the pressure range is larger for the first solenoid versus the second solenoid.

In FIG. 5C, a fourth dispensing system 530 is shown. The fourth dispensing system 530 includes the syrup source 102, the syrup input line 104, the syrup input area 108, the first CO2 input area 106, the second CO2 input area 122, the syrup out line 110, the CF Valve 112, the solenoid valve 114, the needle valve 502, the tube orifice 116, the check valve/adaptor 118, and the dispensing unit 120. Further, the fourth dispensing system 530 includes the second CO2 input area 122, a third CF Valve 532, the pressurized vessel 126 with the concentrate bag 128, the second CF Valve 514, the second solenoid valve 512, another tube orifice 116 which feeds into the dispensing unit 120). In this example, solenoid valve 114 and/or the second solenoid valve 512 may be reduced in size and cost because the CF Valve 112, the second CF Valve 514, and/or the third CF Valve 532 maintains a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 30 PSI) to a second pressure (e.g., 50 PSI) has a first cost. Whereas, a second solenoid that has to be able to handle varying pressures from a third pressure (e.g., 13.6 PSI) to a fourth pressure (e.g., 14.4 PSI) has a second cost (see FIGS. 2A and 2B). In this example, the first cost is higher than the second cost because the pressure range is larger for the first solenoid versus the second solenoid.

Figure 5D:
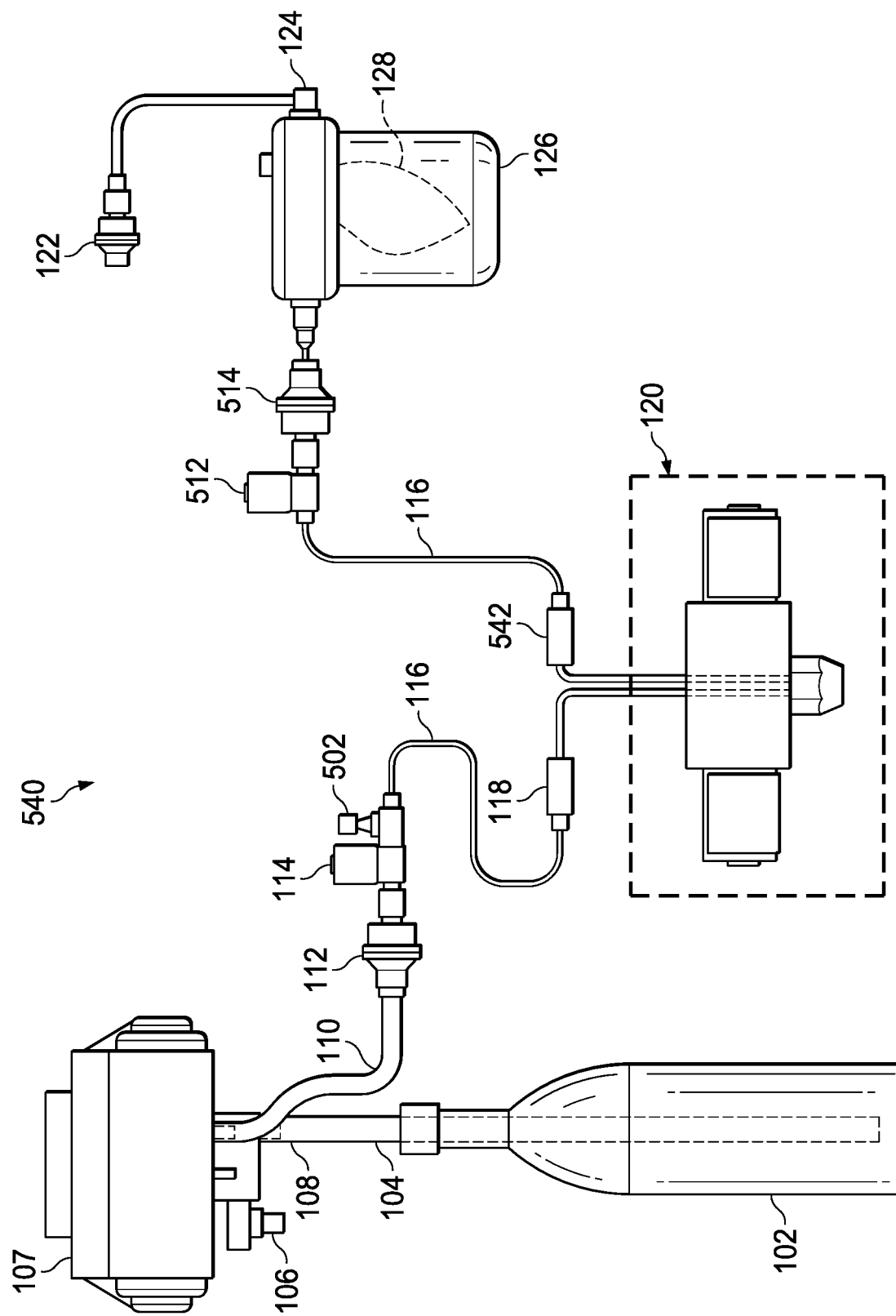
FIG. 5D is another illustration of a dispensing system, according to one embodiment.

In FIG. 5D, a fifth dispensing system 540 is shown. The fifth dispensing system 540 includes the syrup source 102, the syrup input line 104, the syrup input area 108, the first CO2 input area 106, the second CO2 input area 122, the syrup out line 110, the CF Valve 112, the solenoid valve 114, the needle valve 502, the tube orifice 116, the check valve/adaptor 118, and the dispensing unit 120. Further, the fifth dispensing system 540 includes the second CO2 input area 122, the purge valve 124, the second CF Valve 514, the second solenoid 512, the pressurized vessel 126 with the concentrate bag 128, another tube orifice 116, and a second check valve/adaptor 542 (which feeds into the dispensing unit 120). In this example, solenoid valve 114 and/or second solenoid valve 512 may be reduced in size and cost because the CF Valve 112 and/or the second CF Valve maintain a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 10 PSI) to a second pressure (e.g., 70 PSI) has a first cost. Whereas, a second solenoid that has to be able to handle varying pressures from a third pressure (e.g., 13.9 PSI) to a fourth pressure (e.g., 14.1 PSI) has a second cost (see FIGS. 2A and 2B). In this example, the first cost is higher than the second cost because the pressure range is larger for the first solenoid versus the second solenoid.

In FIGS. 5E-5J, the cf valves are shown. A fluid mixing and delivery system comprises a mixing chamber; a first supply line for supplying a first fluid component to the mixing chamber via a first CF Valve and a downstream first metering orifice; a second supply line for supplying a second fluid component to the mixing chamber via a second CF Valve and a downstream second metering orifice, with the first and second fluid components being combined in the mixing chamber to produce a fluid mixture; and a discharge line leading from the mixing chamber and through which the fluid mixture is delivered to a dispensing valve. This disclosure relates to a system for precisely metering and mixing fluids at variable mix ratios, and for delivering the resulting fluid mixtures at the same substantially constant flow rate for all selected mix ratios. The system is particularly useful for, although not limited in use to, the mixture of liquid beverage concentrates with a liquid diluent, and one specific example being the mixture of different tea concentrates with water.

Figure 5E:
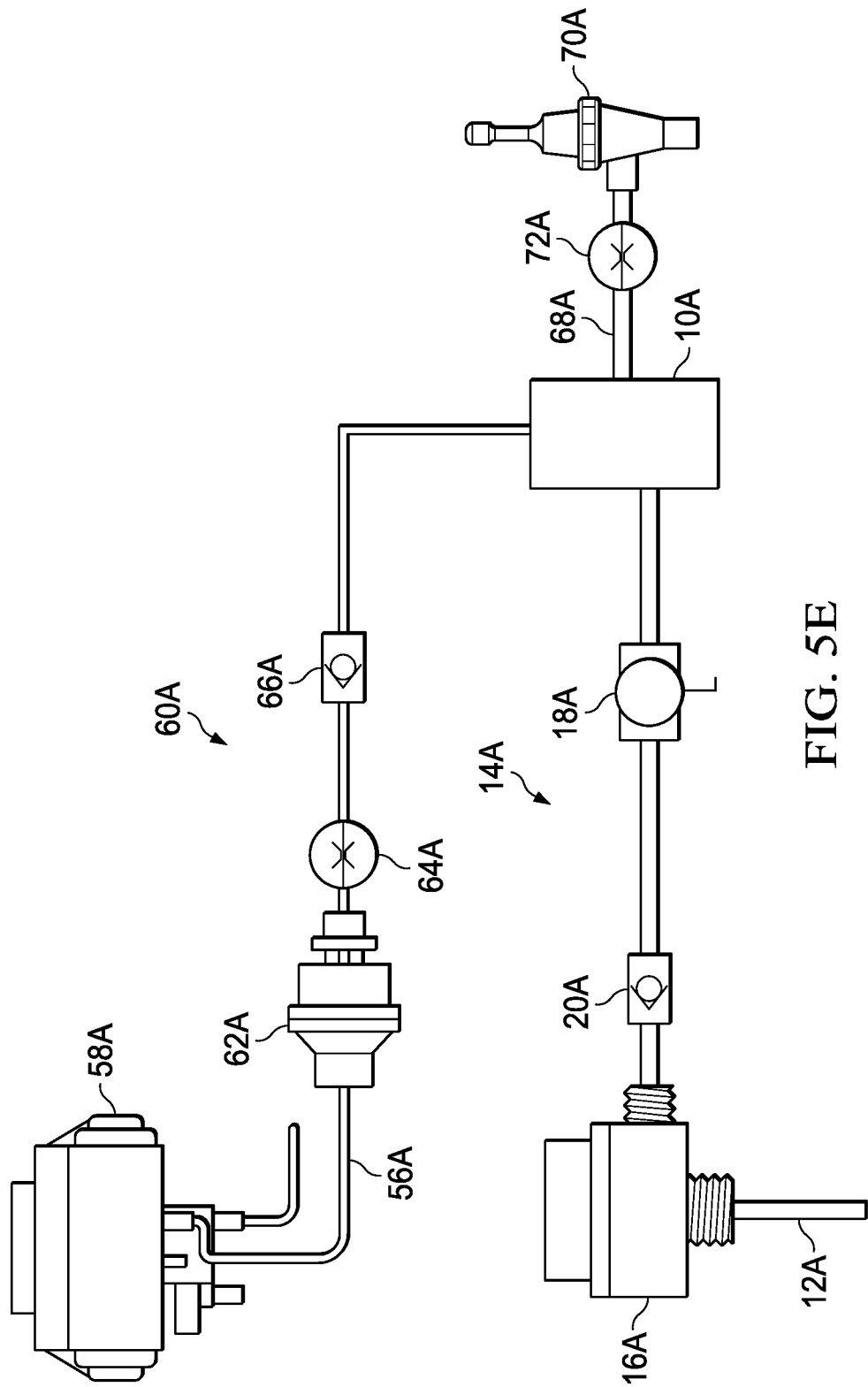
FIG. 5E is another illustration of a dispensing system, according to one embodiment.

With reference initially to FIG. 5E, one embodiment of a system in accordance with the present disclosure includes a mixing chamber 10A. A first fluid component, e.g., a water diluent is received via conduit 12A from a municipal water source and is supplied to the mixing chamber via a first supply line 14A. The first supply line includes a first constant flow valve 16A, a downstream needle valve providing a first metering orifice 18A, the size of which may be selectively varied, and an optional check valve 20A to prevent reverse fluid flow from the mixing chamber.

The constant flow valve (e.g., CF Valve) includes a housing made up of assembled exterior components 22A, 24A. The housing is internally subdivided by a barrier wall 26A into a head section 28A with an inlet 30A and base section subdivided by a modulating assembly 34A into a fluid chamber 36A segregated from a spring chamber 38A.

The modulating assembly 34A includes and is supported by a flexible diaphragm 40A, with a stem 42A that projects through a port 44A in the barrier wall 26A. Stem 42A terminates in enlarged head 46A with a tapered underside 48A surrounded by a tapered surface 50A of the barrier wall. A spring 52A urges the modulating assembly 34A towards the barrier wall 26A.

Figure 5F:
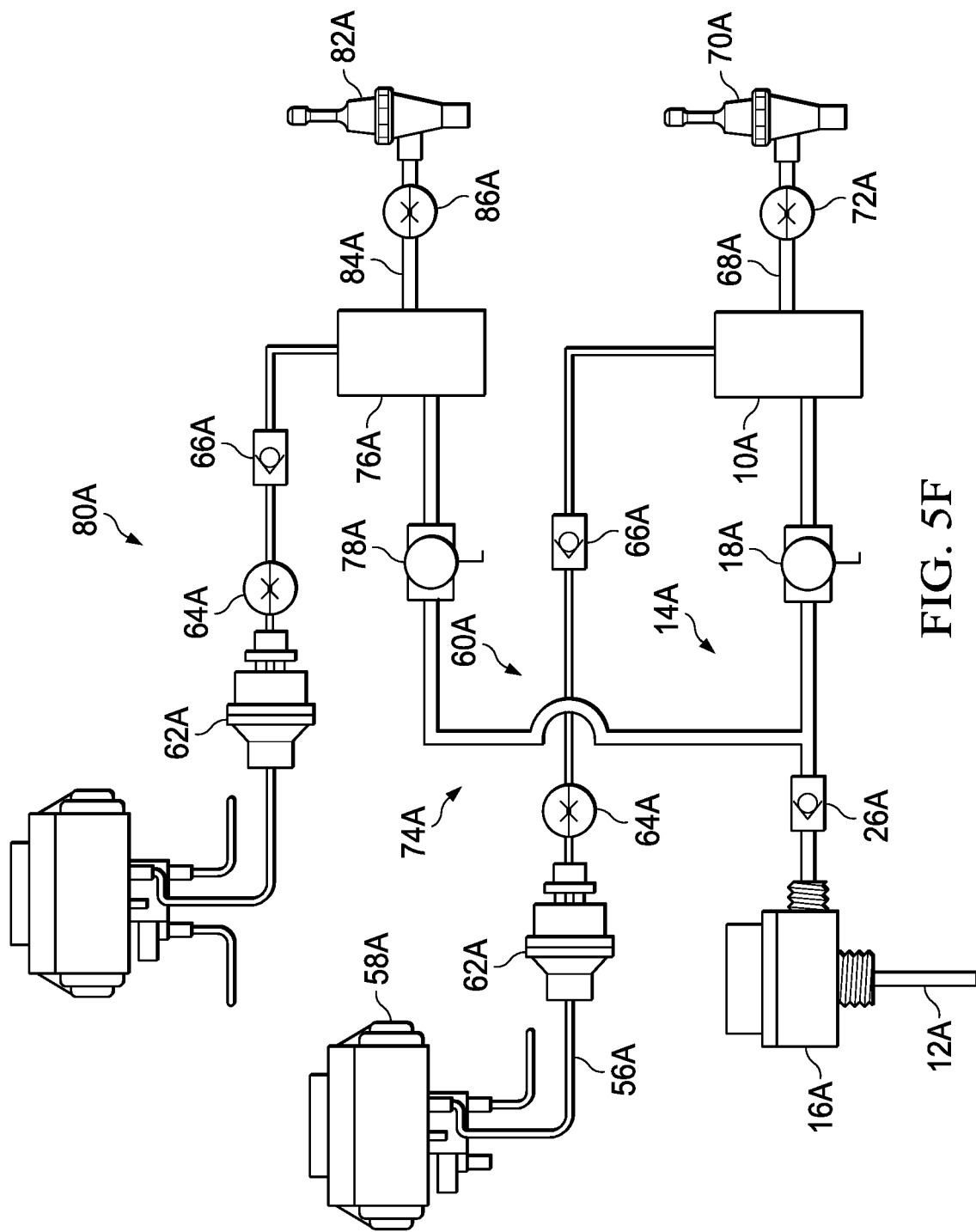
FIG. 5F is another illustration of a dispensing system, according to one embodiment.

The valve inlet 30A is adapted to be connected to conduit 12A, and a valve outlet 54A communicates with the fluid chamber 36A and is adapted to be connected to a remote system component, which in the system under consideration, is the mixing chamber 10A. The valve inlet 30A and outlet 54A respectively lie on axes A1, A2 that are arranged at 90° with respect to each other. Port 44A connects the valve head section 28A to the fluid chamber 36A. Inlet fluid pressures below a threshold level in the head section and fluid chamber are insufficient to overcome the closure force of spring 52A, resulting as depicted in FIG. 5H in the diaphragm being held in a closed position against a sealing ring on the barrier wall, thus preventing fluid flow through the fluid chamber 36A and out through the valve outlet 54A.

Figure 5G:
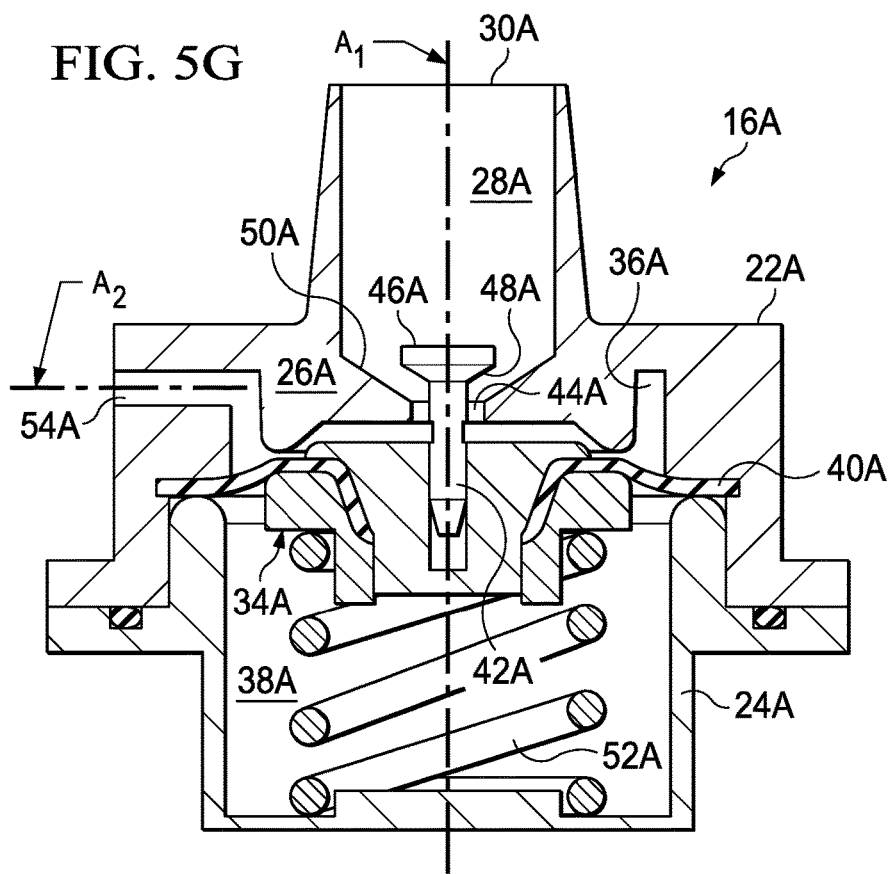
FIG. 5G is an illustration of a cf valve, according to one embodiment.
Figure 5H:
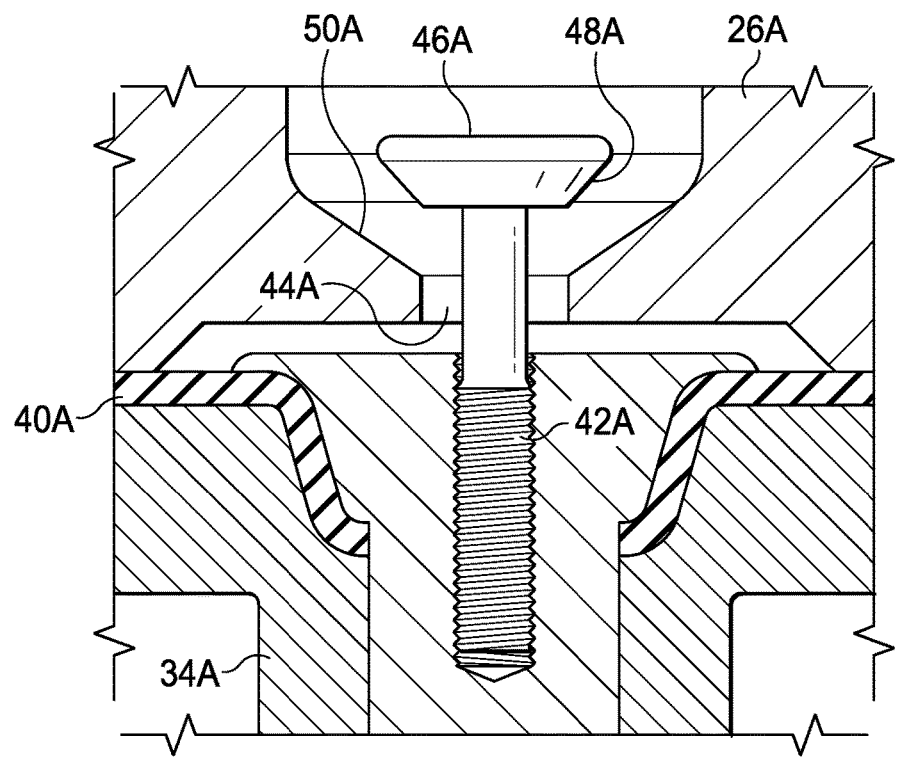
FIG. 5H is another illustration of a cf valve, according to one embodiment.
Figure 5I:
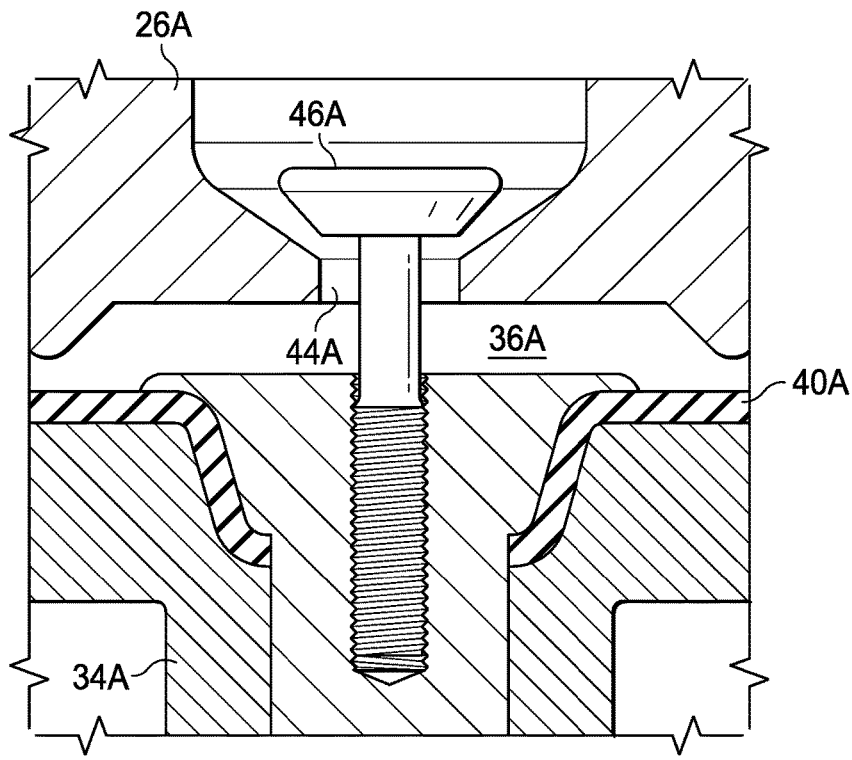
FIG. 5I is an illustration of a cf valve, according to one embodiment.

As shown in FIGS. 5G and 5I, at inlet pressures above the threshold level, the closure force of spring 52A is overcome, allowing the modulating assembly 34A and its diaphragm 40A to move away from the barrier wall 26A as operating pressure in the fluid chamber 36A increases. As fluid exits the fluid chamber, the downstream metering orifice 18A provides a flow restriction that creates a back pressure which adds to the inlet pressure to create a total operating pressure in the fluid chamber 36A.

If the inlet pressure decreases, the force of spring 52A will urge the modulating assembly 34A towards the barrier wall 26A, thus increasing the gap between the tapered surfaces 48A, 50A and increasing the flow of fluid into the fluid chamber 36A in order to maintain the operating pressure substantially constant.

A decrease in back pressure will have the same effect, causing the modulating assembly to move towards the barrier wall until flow through the port 44A is increases sufficiently to restore the operating pressure to its previous level.

Conversely, an increase in back pressure will increase the operating pressure in fluid chamber 36A, causing the modulating assembly to move away from the barrier wall, and reducing the gap between tapered surfaces 48A, 50A to lessen the flow of fluid into and through the fluid chamber 36A.

Figure 5J:
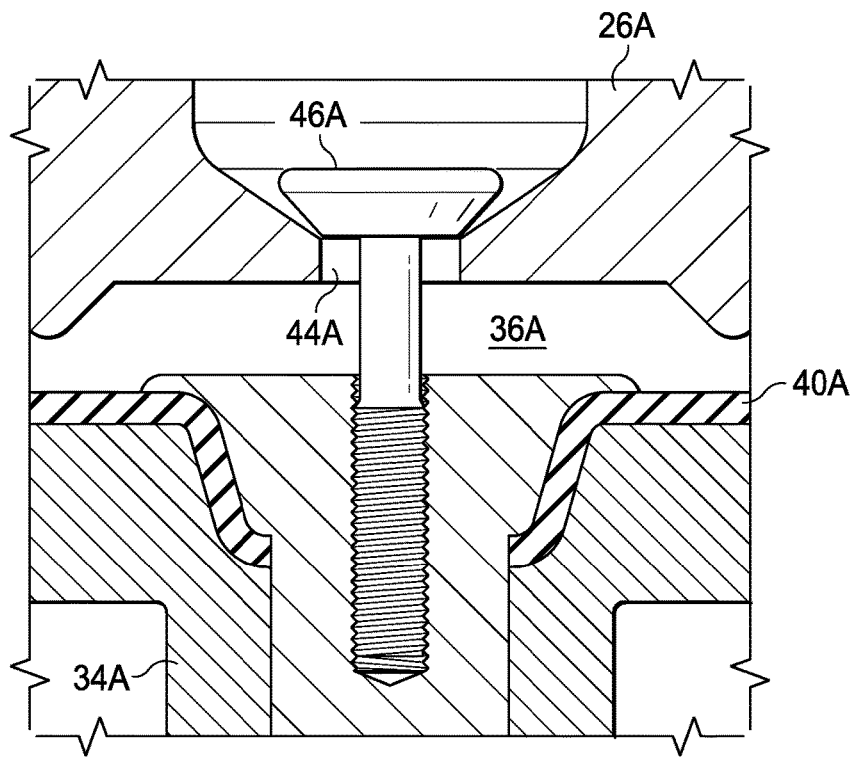
FIG. 5J is an illustration of a cf valve, according to one embodiment.

As shown in FIG. 5J, if the back pressure increases the operating pressure in fluid chamber 36 to a sufficiently high level, the modulating assembly will be moved away from the barrier wall to an extent sufficient to close the gap between tapered surfaces 48A, 50A, thus preventing any further flow through the valve.

Again with reference to FIG. 5E, a second fluid component, e.g., a liquid tea concentrate, is received via conduit 56A and is supplied to the mixing chamber 10A via a second supply line 60A. Conduit 56A is connected to a pressurized source of the second fluid component, one non limiting example being a pump 58A. The second supply line includes a second constant flow valve 62A, a downstream second metering orifice 64A having a fixed size, and another optional check valve 66A. The second constant flow valve may be of a "straight through" type where the valve inlets and outlets lie on the same axis. The first and second constant flow valves 16A, 22A serve to deliver the first and second fluid components to the mixing chamber 10A at substantially constant flow rates and pressures, irrespective of variations in the input pressures in the conduits 12A, 56A above the threshold levels of the valves.

The first and second fluid components are combined in the mixing chamber to produce a fluid mixture having a mix ratio governed by the selected variable size of the first metering orifice 18A and the fixed size of the second metering orifice 64A.

Although not shown, it will be understood that the locations of the first and second metering orifices 18A, 64A may be reversed, with the adjustable metering orifice 18A being located in the second supply line 60A and the fixed metering orifice being located in the first supply line 14A. Alternatively, both the first and second supply lines 14A, 60A may be equipped with adjustable orifices.

A discharge line 68A leads from the mixing chamber 10A and through which the fluid mixture is delivered to a dispensing valve 70A. A third metering orifice 72A is provided in the discharge line. As shown, the third metering orifice is upstream and separate from the dispensing valve. Alternatively, the third metering orifice may be included as an integral component of the dispensing valve.

When the dispensing valve is open, the discharge line 68A has a maximum flow rate that is lower than the combined minimum flow rates of the first and second constant flow valves 16A, 62A, thus creating a backpressure in the first and second supply lines 14A, 60A downstream of their respective constant flow valves. This back pressure adds to the inlet pressures applied to the constant flow valves to maintain the valves in the operating conditions shown in FIGS. 5G and 5I to thereby maintain a substantially constant pressure and flow rate of the first and second fluid components being delivered to the mixing chamber.

Any adjustment to the size of the first metering orifice 18A will result in a change in the flow rate of the first fluid component to the mixing chamber 10A. This in turn will change the backpressure in the mixing chamber and in the second supply line 60A downstream of the second constant flow valve 62A, causing an accompanying inverse change to the flow rate of the second fluid component being delivered through the second constant flow valve to the mixing chamber, and in turn causing a change in the mix ratio of the mixture exiting from the mixing chamber to the dispensing valve 70A. Although the mix ration is changed, the flow rate of the dispensed fluid mixture will remain substantially the same and substantially constant.

Closure of the dispensing valve 70A will produce elevated back pressures in the first and second supply lines 14A, 60A downstream of their respective constant flow valves 16A, 62A, causing the valves to assume the closed settings as shown in FIG. 5J.

In the system embodiment illustrated in FIG. 5F, a third supply line 74A leads from the first supply line 14A to a second mixing chamber 76A. The third supply line 74A includes another adjustable metering orifice 78A. The second mixing chamber 76A is supplied with another fluid component, e.g., a different tea concentrate, via a fourth supply line 80A having the same components as the second supply line 60A. The fluid mixture exits from mixing chamber 76A to another dispensing valve 82A via a discharge line 84A having a metering orifice 86A.

The dispensing valves 70A, 82A may be selectively opened and closed, with constant flow valve 16A acting in concert with the constant flow valves 62A of either or both supply lines 60A, 74A to maintain the selected mix ratios exiting from one or both mixing chambers 10A, 76A at the same substantially constant volumes.

In one embodiment, a dispensing device includes a syrup unit configured to transmit via one or more orifices one or more syrups and water to a dispensing block, a syrup source coupled to the syrup unit configured to provide the one or more syrups to the syrup unit, a water source configured to provide the water to the syrup unit, and a cf valve coupled to a first orifice upstream of a solenoid valve where the cf valve is configured to provide a first range of pressures to the solenoid valve and where the first orifice is coupled to the dispensing block.

In another example, the dispensing device may further include a check valve adaptor coupled to the first orifice downstream of the solenoid valve. Further, the water may be any fluid including carbonated water. In addition, the dispensing device may include a needle valve coupled to the first orifice downstream of the solenoid valve. In another example, the configuration of the solenoid valve may change based on the cf valve providing the first range of pressures to the solenoid valve. The change in configuration of the solenoid valve may reduce a size and/or cost of the solenoid valve. In another example, the first orifice may be either fixed or adjustable and/or a combination of both when there are more than one orifice.

In another example, the cf valve is a regulating valve for maintaining a substantially constant flow of fluid from a variable pressure fluid supply to a fluid outlet, the cf valve may include: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another example, at least one of the one or more syrups is configured to be selectable. In another embodiment, a dispensing device may include: a syrup unit configured to transmit via one or more orifices at least one or more syrups, one or more gases, and water to a dispensing block; a syrup source coupled to the syrup unit configured to provide the one or more syrups to the syrup unit; a water source configured to provide the water to at least one of the syrup unit and the dispensing block; and a cf valve coupled to a first orifice upstream of a solenoid valve, wherein the cf valve is configured to provide a first range of pressures to the solenoid valve where the first orifice is coupled to the dispensing block.

In another embodiment, a dispensing system may include: a first dispensing unit which includes: a first syrup unit which transmits via a first group of orifices a first group of syrups and water to a dispensing block; a first syrup source coupled to the syrup unit which provides the first group of syrups to the first syrup unit; a first water source which provides the water to the first syrup unit; and a first cf valve coupled to a first orifice upstream of a first solenoid valve, where the first cf valve is provides a first range of pressures to the first solenoid valve; and a second dispensing unit which includes: a second syrup unit which transmits via a second group of orifices a second group of syrups and water to the dispensing block; a second syrup source coupled to the second syrup unit via a concentrate bag which provides the second group of syrups to the second syrup unit; and a second solenoid valve coupled to a second orifice where the second orifice is coupled to the dispensing block.

The dispensing system may further include a check valve adaptor coupled to the first orifice downstream of the first solenoid valve. In addition, at least one of the water sources may be carbonated water. Further, the dispensing system may include a needle valve coupled to the first orifice downstream of the first solenoid valve. In another example, the dispensing system may include a second cf valve coupled to the second orifice upstream of the second solenoid valve. In another example, the dispensing system may include a third cf valve coupled a third orifice upstream of the second syrup unit. In addition, the dispensing system may include a second cf valve coupled to a third orifice upstream of the second syrup unit. In another example, the dispensing system may include a check valve coupled to the second orifice downstream of the second solenoid valve.

Further, the first cf valve is a regulating valve for maintaining a substantially constant flow of fluid from a variable pressure fluid supply to a fluid outlet, the first cf valve may include: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another embodiment, a dispensing system may include: a first dispensing unit including: a first syrup unit which transmits via a first group of orifices at least one of a first group of syrups, a first group of gases, and water to a dispensing block; a first syrup source coupled to the syrup unit which provides the first group of syrups to the first syrup unit; a first water source which provides the water to at least one of the first syrup unit and the dispensing block; and/or a first cf valve coupled to a first orifice upstream of a first solenoid valve where the first cf valve is provides a first range of pressures to the first solenoid valve. The dispensing system may further include: a second dispensing unit including: a second syrup unit which transmits via a second group of orifices at least one of a second group of syrups, a second group of gases, and water to the dispensing block; a second syrup source coupled to the second syrup unit via a concentrate bag which provides the second group of syrups to the second syrup unit; a second water source which provides the water to at least one of the second syrup unit and the dispensing block; and a second solenoid valve coupled to a second orifice where the second orifice is coupled to the dispensing block.

In another embodiment, a pressure device includes: a cf valve coupled upstream to a solenoid valve; and a check valve coupled downstream of the solenoid valve where the cf valve provides a range of pressures to the solenoid valve.

In another example, the range of pressures is smaller than a second range of pressures the solenoid valve would encounter in the absences of the cf valve.

All locations, sizes, shapes, measurements, ratios, amounts, angles, component or part locations, configurations, dimensions, values, materials, orientations, etc. discussed above or shown in the drawings are merely by way of example and are not considered limiting and other locations, sizes, shapes, measurements, ratios, amounts, angles, component or part locations, configurations, dimensions, values, materials, orientations, etc. can be chosen and used and all are considered within the scope of the disclosure.

Dimensions of certain parts as shown in the drawings may have been modified and/or exaggerated for the purpose of clarity of illustration and are not considered limiting.

While the valve has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples. Any combination of any element in this disclosure with any other element in this disclosure is hereby disclosed.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A dispensing device comprising:
 a syrup unit configured to transmit via one or more orifices at least one or more syrups, one or more gases, and water to a dispensing block;
 a syrup source coupled to the syrup unit configured to provide the one or more syrups to the syrup unit;
 a water source configured to provide the water to at least one of the syrup unit and the dispensing block; and
 a cf valve coupled to a first orifice upstream of a solenoid valve, wherein the cf valve is configured to provide a first range of pressures to the solenoid valve, the first orifice is surrounded by a membrane where the membrane includes a nitrogen element where nitrogen is inserted into the water via the membrane;
 wherein the first orifice is coupled to the dispensing block.

2. The dispensing device of claim 1, further comprising a check valve adaptor coupled to the first orifice.

3. The dispensing device of claim 1, wherein the water is carbonated water.

4. The dispensing device of claim 1, further comprising a needle valve coupled to the first orifice.

5. The dispensing device of claim 1, wherein the cf valve is a regulating valve for maintaining a constant flow of fluid from a variable pressure fluid supply to a fluid outlet, the cf valve including: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

6. The dispensing device of claim 1, wherein the cf valve is configured to maintain a relative constant flow of fluid from a variable pressure fluid supply to a fluid outlet, the cf valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber, the cup having a cylindrical side wall extending from a bottom wall facing the outlet port to a circular rim surrounding an open mouth facing an inner side of a barrier wall; d) a resilient disc-shaped diaphragm closing the open mouth of the cup; e) a piston assembly secured to a center of the resilient disc-shaped diaphragm, the piston assembly having a cap on one side of the resilient disc-shaped diaphragm facing the inner side of the barrier wall, and a base suspended from an opposite side of the resilient disc-shaped diaphragm and projecting into an interior of the cup; f) a stem projecting from the cap through a first passageway in the barrier wall to terminate in a valve head, the valve head and an outer side of the barrier wall being configured to define a control orifice connecting the inlet port to the diaphragm chamber via the first passageway; and g) a spring device in the cup coacting with the base of the piston assembly for urging in a resilient manner the resilient disc-shaped diaphragm into a closed position against the inner side of the barrier wall to thereby prevent fluid flow from the inlet port via the first passageway into the diaphragm chamber, the spring device being responsive to fluid pressure above a predetermined level applied to the resilient disc-shaped diaphragm via the inlet port and the first passageway by accommodating movement of the resilient disc-shaped diaphragm away from the inner side of the barrier wall, with the valve head on the stem being moved to adjust a size of the control orifice, thereby maintaining the relative constant flow of fluid from the inlet port through the first passageway and the second passageway to the outlet port for delivery to the fluid outlet.

* * * * *